United States Patent Office 3,071,596
Patented Jan. 1, 1963

---

3,071,596
DIHYDRODIBENZOXAZEPINES
Harry Louis Yale, New Brunswick, Francis Alexander Sowinski, Edison, and Jack Bernstein, New Brunswick, N.J., assignors to Olin Mathieson Chemical Corporation, New York, N.Y., a corporation of Virginia
No Drawing. Filed Feb. 20, 1961, Ser. No. 90,232
7 Claims. (Cl. 260—333)

This invention relates to new basically substituted dihydrodibenzoxazepines (and their salts) having valuable therapeutic properties, processes for the preparation thereof, and new intermediates useful in such processes.

The therapeutically active compounds of this invention include dihydrodibenzoxazepines of the general formula:

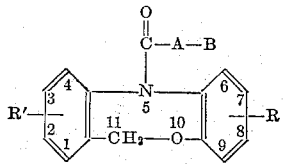

wherein A is a lower alkylene radical, B is a basic saturated nitrogen-containing radical of less than twelve carbon atoms, and R and R' are the same or different and represent hydrogen, halogen, lower alkyl, lower alkoxy, trifluoromethyl, trifluoromethylmercapto, trifluoromethoxy or N,N-dimethylsulfonamido. Among the suitable radicals represented by the symbol B are: amino; (lower alkyl)amino; di(lower alkyl)amino; (hydroxy-lower alkyl)amino; di(hydroxy-lower alkyl)amino; and basic saturated 5 to 6 membered N-heterocyclic radicals of less than twelve carbon atoms, as exemplified by piperidyl [i.e., piperidino, 2-piperidyl, 3-piperidyl and 4-piperidyl]; (lower alkyl)piperidyl [e.g., 2, 3, or 4-(lower alkyl) piperidino or 2, 3, or 4-(N-lower alkyl)piperidyl]; di-(lower alkyl)piperidyl [e.g., 2,4-, 2,5-, or 3,5-di(lower alkyl)piperidino, or 2, 3, or 4-(N-lower alkyl)-2, 3, or 4-(lower alkyl)piperidyl]; (lower alkoxy)piperidyl; pyrrolidyl; (lower alkyl)pyrrolidyl; di(lower alkyl)pyrrolidyl; (lower alkoxy)pyrrolidyl; morpholinyl [i.e., morpholine, 2-morpholinyl and 3-morpholinyl]; (lower alkyl)morpholinyl; di(lower alkyl)morpholinyl; (lower alkoxy)morpholinyl; thiamorpholinyl; (lower alkyl)thiamorpholinyl; di(lower alkyl)thiamorpholinyl; (lower alkoxy)thiamorpholinyl; piperazyl; (lower alkyl)piperazyl (e.g., $N^4$-methylpiperazino); di(lower alkyl)piperazyl; (lower alkoxy)piperazyl; (hydroxy-lower alkyl) piperazyl [e.g., $N^4$-(2-hydroxyethyl)piperazino]; (lower alkanoyloxyalkyl)piperazyl [e.g., $N^4$-(2-acetoxyethyl) piperazino]; (hydroxy-lower alkoxy-lower alkyl)piperazyl [e.g., $N^4$-(2-hydroxyethoxyethyl)piperazino]; and (carbo-lower alkoxy)piperazyl [e.g., $N^4$-(2-carbomethoxy, carboethoxy, or carbopropoxy)piperazino]. The terms "lower alkyl," "lower alkoxy," and "lower alkylene," as employed herein, include both straight and branched chain radicals of less than eight carbon atoms. The particularly preferred compounds are those wherein A is a lower alkylene radical of two to three carbon atoms (i.e., ethylene, trimethylene-1,3, and propylene-1,2); B represents a di(lower alkyl)amino radical, an $N^4$-(lower alkyl)piperazino radical, an $N^4$-(2-hydroxyethyl)piperazino radical, or an $N^4$-(2-acetoxyethyl)piperazino radical, and R and R' are hydrogen.

As to salts of the dihydrodibenzoxazepines, those coming within the purview of this invention include the acid-addition salts, particularly, the non-toxic acid-addition salts. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic and succinic acid.

The compounds of this invention are therapeutically active compounds which are utilizable both as ataractic agents, and thus may be used in the treatment of depressed psychotic states, and an antihistamines. For these purposes they may be administered orally or parenterally in conventional dosage forms such as tablets, capsules, injectables or the like by incorporating the appropriate dose of the compound with carriers according to accepted pharmaceutical practice.

The compounds of this invention are prepared by the process of this invention which is shown in the following equation, wherein R, R', A and B are as hereinbefore defined:

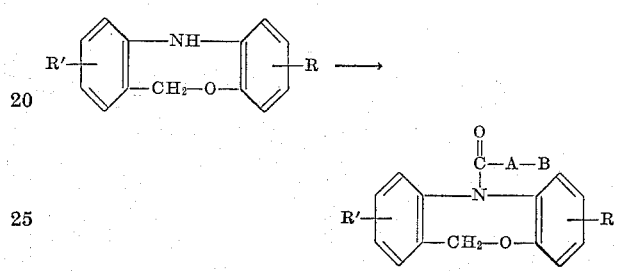

Suitable starting materials for the process of this invention can be prepared as disclosed in our U.S. patent application, Serial No. 90,225, filed on even date herewith. These starting materials are treated with a basically substituted lower alkanoyl halide of the formula: B—A—CO halide, wherein B and A are as hereinbefore defined, the reaction preferably being conducted in the presence of a basic condensation reagent, such as sodium hydride, to yield the final products of this invention. The same compounds can alternatively be prepared in two steps, by first reacting with a halo(lower alkanoyl) halide of the formula: (halo)-A—CO halide and then with a base of the formula: BH. To prepare the acid-addition salts, the resulting base is treated with the desired acid in the usual manner.

The following examples illustrate the invention (all temperatures being in centigrade).

EXAMPLE 1

*2-Dimethylaminoethyl 5,11-Dihydrodibenz [b,e] [1,4] Oxazepin-5-Yl Ketone*

(a) *Preparation of 2-chloroethyl 5,11-dihydrodibenz [b,e] [1,4] oxazepin-5-yl ketone.*—A mixture of 9.0 g. of 5,11-dihydrodibenz [b,e] [1,4] oxazepine, 11.7 g. of β-chloropropionyl chloride and 150 ml. of dry toluene is refluxed for four hours, treated with Darco, filtered, and concentrated to dryness to leave a gummy residue weighing about 10.8 g. The gum crystallizes on drying in vacuo and after recrystallization from hexane melts at about 98–99°.

(b) *Preparation of 2-dimethylaminoethyl 5,11-dihydrodibenz [b,e] [1,4] oxazepin-5-yl ketone.*—A mixture of 10.8 g. of 2-chloroethyl 5,11-dihydrodibenz [b,e] [1,4] oxazepin-5-yl ketone, 18.0 g. of anhydrous dimethylamine and 50 ml. of toluene is heated in a sealed tube at 98° for 24 hours. The reaction mixture is then filtered, the filtrate is concentrated to dryness, and the oily residue dissolved in 100 ml. of ether. The ether solution is extracted with 100 ml. of 5% aqueous hydrochloric acid, the extract made alkaline and the base reextracted with ether. After drying, the ether is removed by distillation and the residue recrystallized three times from a very small amount of diisopropyl ether to give about 5.0 g. of product, M.P. about 78.5–80.0°.

EXAMPLE 2

*2-Diethylaminoethyl 5,11-Dihydrodibenz [b,e] [1,4] Oxazepin-5-Yl Ketone*

Following the procedure of Example 1 but substituting an equivalent amount of diethylamine for the dimethylamine in step *b*, 2-diethylaminoethyl 5,11-dihydrodibenz [b,e] [1,4] oxazepin-5-yl ketone is obtained.

EXAMPLE 3

*2-Dimethylaminoethyl 5,11-Dihydrodibenz [b,e] [1,4] Oxazepin-5-Yl Ketone Hydrochloride*

To a solution of 5.92 g. of 2-dimethylaminoethyl 5,11-dihydrodibenz [b,e] [1,4] oxazepin-5-yl ketone in 25 ml. of anhydrous ether is added 0.75 g. of hydrogen chloride in 10 ml. of anhydrous ether. The precipitated solid is filtered, dried and recrystallized from acetonitrile-ether to give 2-dimethylaminoethyl 5,11-dihydrodibenz [b,e] [1,4] oxazepin-5-yl ketone hydrochloride.

EXAMPLE 4

*2-Dimethylaminoethyl 3-Chloro-5,11-Dihydrodibenz [b,e] [1,4] Oxazepin-5-Yl Ketone*

Following the procedure of Example 3, but substituting an equivalent amount of 3-chloro-5,11-dihydrodibenz [b,e] [1,4] oxazepine for the 5,11-dihydrodibenz [b,e] [1,4] oxazepine in step *a*, 2-dimethylaminoethyl 3-chloro-5,11-dihydrodibenz [b,e] [1,4] oxazepin-5-yl ketone is obtained.

EXAMPLE 5

*2-Dimethylaminoethyl 3-(Trifluoromethyl)-5,11-Dyhydrodibenz [b,e] [1,4] Oxazepin-5-Yl Ketone*

Following the procedure of Example 1, but substituting an equivalent amount of 3-(trifluoromethyl)-5,11-dihydrodibenz [b,e] [1,4] oxazepine for the 5,11-dihydrodibenz [b,e] [1,4] oxazepine in step *a*, 2-dimethylaminoethyl 3-(trifluoromethyl)-5,11-dihydrodibenz [b,e] [1,4] oxazepin-5-yl ketone is obtained.

Similarly, by substituting an equivalent amount of 3-(trifluoromethoxy)-5,11-dihydrodibenz [b,e] [1,4] oxazepine, 3-(trifluoromethylmercapto)-5,11-dihydrodibenz [b,e] [1,4] oxazepine or 3-(N,N-dimethylaminosulfonyl)-5,11-dihydrodibenz [b,e] [1,4] oxazepine for the 5,11-dihydrodibenz [b,e] [1,4] oxazepine in step *a*, Example 1, 2-dimethylaminoethyl 3-(trifluoromethoxy)-5,11-dihydrodibenz [b,e] [1,4] oxazepin-5-yl ketone, 2-dimethylaminoethyl 3 - (trifluoromethylmercapto)-5,11-dihydrodibenz [b,e] [1,4] oxazepin-5-yl and 2-dimethylaminoethyl 3-(N,N-dimethylaminosulfonyl)-5,11-dihydrodibenz [b,e] [1,4] oxazepin-5-yl are prepared, respectively.

EXAMPLE 6

*2-Dimethylaminoethyl 7-Methyl-5,11-Dihydrodibenz [b,e] [1,4] Oxazepin-5-Yl Ketone*

Following the procedure of Example 1, but substituting an equivalent amount of 7-methyl-5,11-dihydrodibenz [b,e] [1,4] oxazepine for the 5,11-dihydrodibenz [b,e] [1,4] oxazepine in step *a*, 2-dimethylaminoethyl 7-methyl-5,11-dihydrodibenz [b,e] [1,4] oxazepin-5-yl ketone is obtained.

EXAMPLE 7

*2 - Dimethylaminoethyl 3,7-Dichloro-5,11-Dihydrodibenz [b,e] [1,4] Oxazepin-5-Yl Ketone*

Following the procedure of Example 1, but substituting an equivalent amount of 3,7-dichloro-5,11-dihydrodibenz [b,e] [1,4] oxazepine for the 5,11-dihydrodibenz [b,e] [1,4] oxazepine in step *a*, 2-dimethylaminoethyl 3,7-dichloro-5,11-dihydrodibenz [b,e] [1,4] oxazepin-5-yl ketone is obtained.

EXAMPLE 8

*Dimethylaminomethyl 5,11-Dihydrodibenz [b,e] [1,4] Oxazepin-5-Yl Ketone*

Following the procedure of Example 1, but substituting an equivalent amount of chloroacetyl chloride for the β-chloropropionyl chloride in step *a*, dimethylaminomethyl 5,11-dihydrodibenz [b,e] [1,4] oxazepin-5-yl ketone is obtained.

EXAMPLE 9

*2-($N^4$-Methylpiperazino)Ethyl 5,11-Dihydrodibenz [b,e] [1,4] Oxazepin-5-Yl Ketone*

Following the procedure of Example 1, but substituting an equivalent amount of N-methylpiperazine for the dimethylamine in step *b*, 2-($N^4$-methylpiperazino)ethyl 5,11-dihydrodibenz [b,e] [1,4] oxazepin-5-yl ketone is obtained.

Similarly, by substituting an equivalent amount of N-(2-hydroxyethyl)piperazine, N-(2-acetoxyethyl)piperazine, or N-(2-hydroxyethoxyethyl)piperazine for the dimethylamine in step *b* of Example 1, 2-[$N^4$-(2-hydroxyethyl)piperazino]ethyl 5,11-dihydrodibenz [b,e] [1,4] oxazepin-5-yl ketone, 2-[$N^4$-(2-acetoxyethyl)piperazino]ethyl 5,11-dihydrodibenz [b,e] [1,4] oxazepin-5-yl ketone, and 2-[$N^4$-(2-hydroxyethoxyethyl)piperazino]ethyl 5,11-dihydrodibenz [b,e] [1,4] oxazepin-5-yl ketone are obtained respectively.

This invention may be variously otherwise embodied within the scope of the appended claims.

What is claimed is:

1. A compound selected from the group consisting of bases of the formula

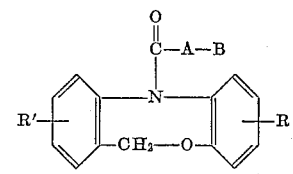

wherein A is lower alkylene, B is selected from the group consisting of amino, (lower alkyl)amino, di(lower alkyl)amino, (hydroxy-lower alkyl)amino, di(hydroxy-lower alkyl)amino, piperidyl, (lower alkyl)piperidyl, di(lower alkyl)piperidyl, (lower alkoxy)piperidyl, pyrrolidyl, (lower alkyl)pyrrolidyl, di(lower alkyl)pyrrolidyl, (lower alkoxy)pyrrolidyl, morpholinyl, (lower alkyl)morpholinyl, di(lower alkyl)morpholinyl, (lower alkoxy)morpholinyl, thiamorpholinyl, (lower alkyl)thiamorpholinyl, di(lower alkyl)thiamorpholinyl, (lower alkoxy)thiamorpholinyl, piperazyl, (lower alkyl)piperazyl, di(lower alkyl)piperazyl, (hydroxy-lower alkyl)piperazyl, (lower alkanoyloxyalkyl)piperazyl, (hydroxy-lower alkoxy-lower alkyl)piperazyl, and (carbo-lower alkoxy)piperazyl and R and R' are each selected from the group consisting of hydrogen, halogen, lower alkyl, lower alkoxy, trifluoromethyl, trifluoromethylmercapto, trifluoromethoxy and N,N-dimethylsulfonamido and non-toxic acid-addition salts thereof.

2. Di(lower alkyl)amino(lower alkyl) 5,11-dihydrodibenz [b,e] [1,4] oxazepin-5-yl ketone.

3. A non-toxic acid-addition salt of the compound of claim 2.

4. 2 - dimethylaminoethyl 5,11-dihydrodibenz [b,e] [1,4] oxazepin-5-yl ketone.

5. A compound of the formula

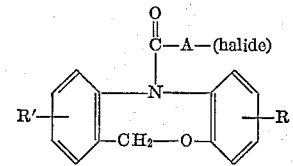

wherein A is lower alkylene and R and R' are each selected from the group consisting of hydrogen, halogen, lower alkyl, lower alkoxy, trifluoromethyl, trifluoromethylmercapto, trifluoromethoxy and N,N-dimethylsulfonamido.

6. Chloro(lower alkyl) 5,11-dihydrodibenz [b,e] [1,4] oxazepin-5-yl ketone.

7. 2-chloroethyl 5,11-dihydrodibenz [b,e] [1,4] oxazepin-5-yl ketone.

References Cited in the file of this patent
UNITED STATES PATENTS
2,666,051    Hafliger et al. _____ Jan. 12, 1954